US011952828B1

(12) United States Patent
Brooks et al.

(10) Patent No.: US 11,952,828 B1
(45) Date of Patent: Apr. 9, 2024

(54) THERMAL BARRIER SYSTEMS AND METHODS FOR ACCESS DELAY

(71) Applicant: National Technology & Engineering Solutions of Sandia, LLC, Albuquerque, NM (US)

(72) Inventors: Scott H. Brooks, Albuquerque, NM (US); Fredrick Joseph Snoy, III, Albuquerque, NM (US); Aaron C. Hall, Albuquerque, NM (US); Pylin Sarobol, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 1415 days.

(21) Appl. No.: 15/233,735

(22) Filed: Aug. 10, 2016

Related U.S. Application Data

(60) Provisional application No. 62/204,789, filed on Aug. 13, 2015, provisional application No. 62/204,773, filed on Aug. 13, 2015.

(51) Int. Cl.
*E05G 1/02* (2006.01)
*B65D 1/40* (2006.01)
*E05G 1/024* (2006.01)

(52) U.S. Cl.
CPC ............... *E05G 1/024* (2013.01); *B65D 1/40* (2013.01); *E05Y 2800/414* (2013.01); *E05Y 2800/426* (2013.01)

(58) Field of Classification Search
CPC .......... E05G 1/024; B65D 1/40; B65D 81/38; B65D 81/3813; F17C 1/005; F17C 2203/0619; F17C 2203/0626; F17C 2209/232; E05Y 2800/414; E05Y 2800/426; E05Y 2800/424; E05Y 2800/40
USPC ..... 220/62.17, 62.11, 592.26, 592.2, 592.01, 220/586, 581; 428/548, 546, 34.5, 34.4, 428/35.8; 427/453, 455, 456; 52/515, 52/741.4, 79.1
See application file for complete search history.

(56) References Cited

U.S. PATENT DOCUMENTS

| | | | | | |
|---|---|---|---|---|---|
| 2,057,254 | A | * | 10/1936 | Sommer | A47J 36/02 220/573.1 |
| 2,967,152 | A | * | 1/1961 | Matsch | C09K 5/14 114/74 A |
| 3,245,577 | A | * | 4/1966 | Virzi | B65D 7/00 205/154 |
| 3,573,963 | A | * | 4/1971 | Maxwell | B24C 11/00 148/535 |
| 4,684,553 | A | * | 8/1987 | Sasaki | B32B 27/36 220/62.12 |

(Continued)

FOREIGN PATENT DOCUMENTS

| | | | | | |
|---|---|---|---|---|---|
| GB | 2319783 | A | * | 6/1998 | C23C 28/3215 |
| JP | 2008143585 | A | * | 6/2008 | B65D 5/40 |

*Primary Examiner* — Robert J Hicks
(74) *Attorney, Agent, or Firm* — Daniel J. Jenkins

(57) ABSTRACT

Protective barrier includes a soft metal that inhibits or delays thermal or grinding attack tool penetration. The soft metal, which may be disposed between other layers and otherwise delays thermal attack by expanding or "puffing" during attack. The soft metal can inhibit mechanical attack by rapid ablation and wear of a cutting wheel or blade. The protective barrier may additionally include an oxide or carbide layer.

15 Claims, 6 Drawing Sheets

(56) References Cited

U.S. PATENT DOCUMENTS

| | | | | | |
|---|---|---|---|---|---|
| 4,759,957 | A * | 7/1988 | Eaton | C23C 4/04 | 427/226 |
| 4,906,431 | A * | 3/1990 | Brundbjerg | C23C 4/11 | 427/427 |
| 5,589,252 | A * | 12/1996 | Matsuo | C08J 7/048 | 428/35.8 |
| 5,952,056 | A * | 9/1999 | Jordan | C23C 4/02 | 164/46 |
| 5,981,091 | A * | 11/1999 | Rickerby | C23C 10/28 | 428/617 |
| 6,025,078 | A * | 2/2000 | Rickerby | C04B 35/486 | 427/419.2 |
| 6,338,870 | B1 * | 1/2002 | Jaccoud | B65D 5/563 | 427/255.27 |
| 6,576,294 | B1 * | 6/2003 | Phillips | B32B 27/06 | 204/192.1 |
| 2009/0110903 | A1 * | 4/2009 | Margolies | C23C 4/02 | 428/304.4 |
| 2010/0122747 | A1 * | 5/2010 | Blencoe | C01B 3/0078 | 138/140 |
| 2016/0130705 | A1 * | 5/2016 | Nardi | C23C 4/02 | 427/404 |

* cited by examiner

THERMAL BARRIER SYSTEMS AND METHODS FOR ACCESS DELAY

CROSS-REFERENCE TO RELATED APPLICATIONS

This application claims priority to U.S. Provisional Patent Application No. 62/204,773, filed on Aug. 13, 2015, entitled "ACCESS DELAY SYSTEMS AND METHODS," and to U.S. Provisional Patent Application No. 62/204,789, filed Aug. 13, 2015, entitled "ACCESS DELAY SYSTEMS AND METHODS," the entireties of which are incorporated herein by reference.

GOVERNMENT RIGHTS

The Government has rights to this invention pursuant to Contract No. DE-AC04-94AL85000 awarded by the U.S. Department of Energy.

FIELD

The invention relates generally to access delay, and more particularly to systems and methods that include soft barrier materials to delay and resist thermal and mechanical attack tool penetration.

BACKGROUND OF THE INVENTION

Physical security barriers present a continuing design and engineering challenge. New approaches are needed to protect against improved breaching tools and innovative attack scenarios. Often, barrier designs are constrained by cost, weight, and volume.

When trying to protect valuable items from being stolen, destroyed or tampered with, it is important to prevent adversaries from being able to get past security barriers. Thermal attack tools are common tools adversaries might use to defeat a steel physical security barrier. Additionally, mechanical attack tools, such as angle grinders, are common tools an adversary might use to defeat a hardened physical security barrier. Increasing the time an adversary must spend defeating a barrier by thermal and mechanical attack tools provides time for security force response and reduces the likelihood of a successful attack.

Current systems and methods include the use of hardened materials to delay access. However, modern thermal and mechanical attack tools such as exothermic torches and grinders, respectively, have been shown to quickly penetrate even the hardest materials.

Thus, inexpensive, lightweight materials that resist thermal and mechanical attack tools would be valuable to the physical security community.

SUMMARY OF THE INVENTION

The present disclosure is directed to systems and methods that inhibit or delay thermal attack, such as by exothermic torches such as a Broco™ torch, an oxyacetylene (OA) torch, or a plasma cutter, as well as mechanical attack, such as by grinding. The systems and methods delay breaching or penetration by these tools by applying a barrier layer to a surface of a barrier or to the surface of a barrier of an enclosure into which an adversary may attempt to penetrate. The barrier layer may be a soft metal, soft metal alloy, or soft metal/alloy composite material.

In an embodiment, a barrier system is disclosed that includes a substrate and a barrier layer applied to and coated upon the substrate. The barrier layer a metal selected from a group consisting of zinc, lead, tin, antimony, bismuth, aluminum, gallium, thallium, indium and copper.

In another embodiment, a container for securing an item is disclosed that includes an enclosure at least partially defining an interior space, the enclosure including a barrier system that includes the barrier system that includes a substrate; and a barrier layer applied to and coated upon the substrate. The barrier layer includes a metal, and the metal is selected from a group consisting of zinc, lead, tin, antimony, bismuth, aluminum, gallium, thallium, indium and copper.

One advantage of the present disclosure is to provide systems and methods that inexpensively improve thermal and cutting tool attack resistance or access delay time.

Another advantage of the present disclosure is to provide systems and methods that covertly improve thermal and cutting attack tool resistance or access delay time while minimizing the weight of the barrier providing the delay.

Another advantage of the present disclosure is to provide a barrier to both thermal attack and abrasive grinding tools.

Another advantage of the present disclosure is the ability to frustrate application of grinding wheel through rapid ablation and wear of the wheel resulting in a need for frequent blade changes.

Another advantage of the present disclosure is to increase access delay to existing systems by applying a barrier coating without the use of mechanical fasteners, welding, machining, or damaging the underlying substrate. The barrier layer coating is applied by a thermal spraying or additive manufacturing process that allows the barrier layer coating to be applied to uneven surfaces.

DETAILED DESCRIPTION OF THE INVENTION

The present disclosure is directed to systems and methods that delay thermal and cutting attack tool penetration by applying a barrier layer to a surface of a substrate that forms at least part of an enclosure for securing a valuable item. In an embodiment, the barrier may be a portion of an enclosure into which an adversary may attempt to penetrate. The barrier layer is formed of a barrier material that is a soft metal, metal alloy or metal/alloy composite material. A barrier layer structure is also disclosed that includes the barrier layer and one or more other material layers. Applicant has found that the disclosed barrier provides an unexpected result as to the delay of breaching by thermal and/or cutting attack.

Figure 1:
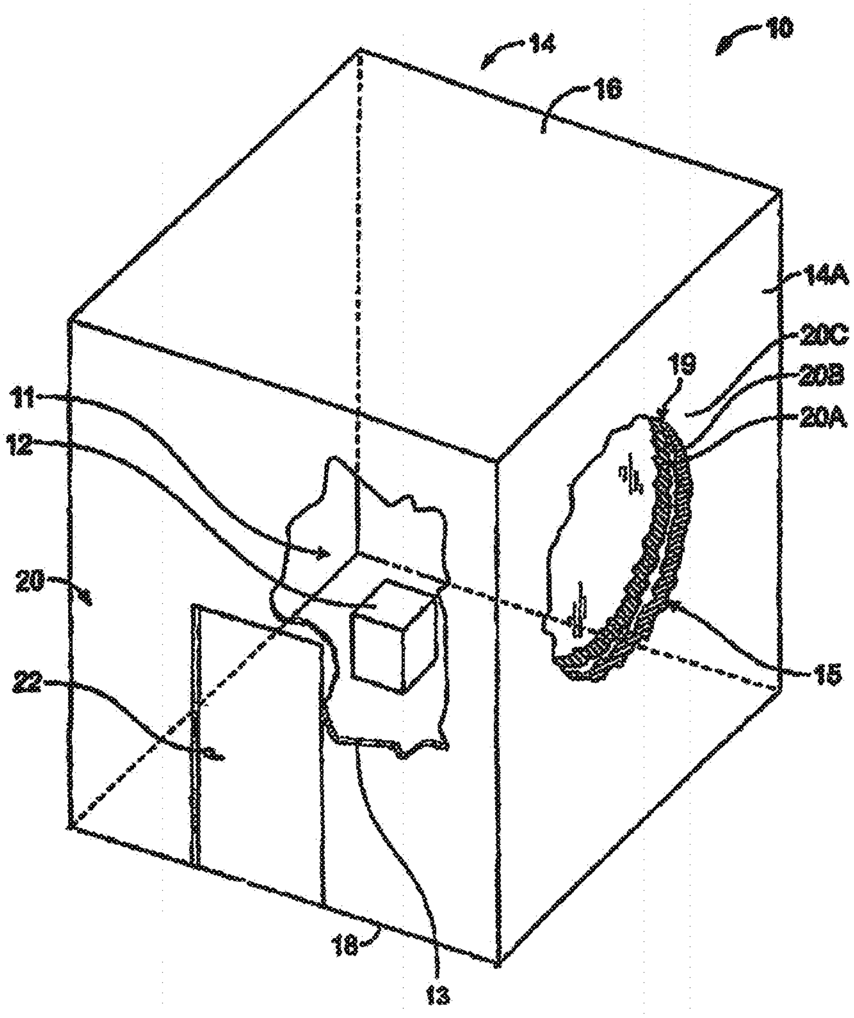
FIG. 1 illustrates an enclosure according to an embodiment of the disclosure.

FIG. 1 illustrates a container 10 for retaining or securing a valuable item 12 according to an embodiment of the disclosure. In this exemplary embodiment, the valuable item 12 is shown as a container or box, however, it should be appreciated that the form of the valuable item 12 may vary as determined by the user's application. For example, the valuable item may be, but is not limited to monetary value, information value, or system security value. For example, the item 12 may be, but is not limited to valued assets, such as, but not limited to precious metals or gems, money, precious art, electronics such as, but not limited to data storage, computer processing units and circuits, wires and cables, security devices, controls, network communications equipment, radiological and hazardous materials or weapons.

The container 10 forms or creates restricted access to the item 12, shown through cutaway 13. In this exemplary embodiment, the container 10 includes a plurality of walls or barriers 14, including a top barrier 16, a bottom barrier 18 and side barriers 20. The container 10 defines an interior, secure space 11. In this exemplary embodiment, the barriers 14 are walls or plates are shown having flat surfaces. In other embodiments, the barriers 14 may not be flat, but may be, but are not limited to having flat, curved, wavy, undulating, rippled, curvilinear, rough, honeycomb and edged surfaces. In yet other embodiments, the container 10 may be formed of one or more barriers of varying geometric shapes. For example, the container 10 may be a cylinder in which a valuable item is disposed there within. In this exemplary embodiment, the container 10 includes an access or entry portion 22, which in this exemplary embodiment is a door having restricted access or which otherwise includes restrictive protections, such as, but not limited to locks. In other embodiments, the container 10 may not include an entry portion or may have an entry portion that is not restricted to personnel with granted access.

The barriers 14 include at least one barrier 14A that is designed to prohibit or delay access by a thermal or mechanical breaching tool. The thermal breaching tool may be an oxyacetylene torch, an exothermic torch such as a Broco™ torch, or a plasma cutter. The mechanical breaching tool is an abrasive or toothed cutting or grinding tool. For example, the grinding tool, may be, but is not limited to an angle grinder. In this exemplary embodiment, only one barrier 14A is shown to be designed to prohibit or delay access by a thermal or grinding breaching tool, however, in other embodiments, one or more of the barriers 14 may be designed to prohibit or delay access by a thermal or grinding breaching tool.

As can be seen in FIG. 1, barrier 14A is shown with a cutaway 15 to illustrate the construction of a barrier system 19. Barrier system 19 including a substrate 20A, a barrier layer 20B, and an optional outer layer 20C. In this exemplary embodiment, the substrate 20A is steel, however, in other embodiments, the substrate 20A may be any material upon which the barrier layer 22B may be disposed, such as, but not limited to metals, ceramics, cermets, concrete, wood, foam, composites, and plastics. The metal substrate may be, but is not limited to steel, stainless steel, Inconel, aluminum, and copper. The substrate may a formed of, but not limited to sheets, plates, bars, foams, and honeycomb. In an embodiment, the steel may be a A36 or 304 stainless steel. In an embodiment, an entire outward surface of an enclosure may be coated with the barrier layer to delay an adversary attempting to penetrate the enclosure in order to bypass locks, tamper-resistant fasteners or other known security features and sensors. In such a manner, the barrier layer provides whole-surface delay against mechanical or thermal penetration. In other embodiments, only a portion of an outward surface of the enclosure may be coated with the barrier layer, if only that portion is accessible to an adversary.

The barrier layer 20B is formed of a barrier material. The barrier material is a metal, alloy or metal alloy composite selected from zinc, lead, tin, antimony, bismuth, aluminum, gallium, thallium, indium and copper. Alloys and composites are formed of 50 percent or more of a metal from the list above. The barrier layer 20B is between 0.1 mm and 17 mm thick. In another embodiment, the barrier layer 20B may be between 0.5 mm and 15 mm thick. In an embodiment, the barrier layer 20B is between 2 mm and 10 mm thick.

The barrier layer 20B is formed by an additive manufacturing process by thermal spraying of the barrier material, so that the barrier material is applied to and coated upon the substrate. Thermal spraying refers to a family of coating processes based on liquid droplet deposition. In an embodiment, spray torches are used to melt and propel droplets of feed stock material toward the substrate. The feed stock material is passed through a spray device which propels 10-100 μm molten feed stock droplets onto the substrate. When those droplets encounter the substrate they flatten, solidify, and consolidate to build a coating with a lamellar microstructure. In an embodiment, the barrier layer may be thermal sprayed using a "cored" soft metal wire having a core of ceramic particles or grains. The result is a soft metal matrix coating with discontinuous embedded ceramic abrasion-resistant grains throughout.

In another embodiment, the barrier material is a cermet formed of the barrier material as a matrix and dispersed ceramic particles. The ceramic particles may be, but are not limited to carbides, nitrides, oxides and borides. The carbide may be, but is not limited to $B_4C$ and SiC. The oxide may be, but is not limited to YSZ and $Al_2O_3$. The cermet layer is of the same thickness ranges as disclosed for the barrier layer. In an embodiment, a barrier layer may be formed on a steel substrate (e.g., A36 carbon steel or 304 stainless steel), via a thermal spray process using a "cored" Zn wire having a core of Boron-Carbide or Silicon-Carbide grains. The result is a Zn metal matrix coating with discontinuous embedded $B_4C$ or SiC abrasion-resistant grains throughout.

In other embodiments, the barrier system 19 may include an additional barrier layer (not shown) of harder, additional barrier materials adjacent to the barrier material. The additional barrier layer is formed of other additional barrier materials, such as, but not limited to metal alloys and ceramics. In an embodiment, the additional barrier layer may include one or more additional barrier layers.

The additional barrier layer is disposed between the substrate 20A and the barrier layer 20B. In this embodiment, the additional barrier layer is coated upon the substrate 20A and the barrier layer 20B is then coated upon the additional barrier layer. The additional barrier layer is coated upon the substrate by a coating method, such as, but not limited to thermal spray coating. The barrier layer 20B is then coated upon the additional barrier layer by thermal spraying. In other embodiments, the additional barrier layer may be disposed on the outward facing side of the barrier layer 20B, the outward facing side being the side away from the interior space 11. An outwardly disposed additional barrier layer coated upon the barrier layer 20B by any of the additional barrier layer coating methods discussed above. In yet other embodiments, additional barrier layers may be present on both the interior and exterior or outward facing surfaces of the barrier layer 20B.

The additional barrier material may be a ceramic material. In an embodiment, the ceramic may be an oxide, carbide or combinations thereof. In an embodiment the additional barrier material may be an oxide. The oxide may be, but is not limited to $Al_2O_3$, $TiO_2$, and yttria-stabilized zirconia (YSZ). In another embodiment, the carbide may be, but is not limited to tungsten carbide (WC). In other embodiments, the additional material may be a ceramic material selected from a group including, but not limited to $Al_2O_3$, $TiO_2$, yttria-stabilized zirconia (YSZ), and mixtures. The ceramic additional barrier material layer is between 0.1 mm and 2 mm thick. In an embodiment, the ceramic additional barrier material layer is between 0.1 mm and 1.0 mm thick.

When the additional barrier material layer is a metal, metal alloy, or metal based composite, the additional barrier layer may be between 0.1 mm and 17 mm thick. In another embodiment, the additional barrier layer may be between 0.1 and 15 mm thick. In another embodiment, the additional barrier layer may be between 0.1 mm and 2 mm thick. For example, the additional material may be, but not limited to WC,Ni(WC—Ni) materials between 0.1 mm and 2 mm thick. In another embodiment, the additional material layer may be between 2 mm and 17 mm thick. In an embodiment, the additional material may be Ni-35(WC-8Ni)-11Cr-2.5B-2.5Fe-2.5Si-0.5C. In some applications, an intermediate layer formed of the additional material may act as a fuse or bond layer for the barrier layer to improve adherence of the barrier layer to the substrate. In an embodiment, intermediate layer may be formed of Ni-35(WC-8Ni)-11Cr-2.5B-2.5Fe-2.5Si-0.5C. The ceramic barrier layer has inherent high melting temperature and low thermal conductivity so it is able to delay the heat transfer to the underlying materials.

In other embodiments, the barrier system 19 may be, or may form part of, an enclosure for retaining or securing a valuable item. For example, the barrier system 19 may be a panel or plate that that forms in whole or in part a structure, enclosure or wall that protects a valuable item. The barrier delays access to a valuable item from attach by an intruder or adversary. For example, the panel may be within or beneath a wall or floor, thereby providing a covert cover or barrier to intrusion into a secure area holding the valuable item. In other exemplary applications, the barrier may include, but is not limited to cages, bars, vault panels, wall panels of safes, transportation containers to which the barrier material is applied.

Referring again to FIG. 1, the barrier 14A further includes an outer layer 20C. In this exemplary embodiment, the outer layer 20C is a concrete wall adjacent to the barrier layer 20B. In other embodiments, the outer layer 20C may be formed of concrete, plastic, ceramic, wood or other structural material adjacent the barrier layer 20B. In other embodiments, the outer layer 20C may be a coating upon the barrier layer 20B, such as, but not limited to paint, polymer films and epoxy.

It is believed that one of the mechanisms by which the barrier layer delays access and resists thermal attack tool cutting is by expansion of the barrier metal layer upon exposure to an intense heat source. The expansion may be referred to as "puffing." This phenomenon has been unexpectedly observed by the inventors. The "puffing" action inhibits heat transfer to the underlying material. The puffing is caused by microscopic voids along splat boundaries in Zinc that form during the electric arc-spray process which expand, puff, and coalesce into a macroscopic void network when exposed to an extreme thermal input. The mechanism for puffing is direct sublimation of the Zinc and rapid expansion of the Zinc vapor. The result is a dramatically improved thermal barrier against exothermic torch perforation cuts. This is non-intuitive since a low-melting point (419.53° C.) and boiling point (907° C.) metal would not be expected to provide good thermal resistance against an intense heat source (3,980° C.). In an embodiment, a barrier layer can be further engineered to optimize the "puffing" mechanism by either modifying the thermal spray process and resulting lamellar void microstructure, incorporating materials into barrier layer that promote expansion and heat dissipation, such as by adding polymer in the form of polymer islands or particles to the barrier material.

It is further believed that one of the mechanisms by which the barrier delays access from cutting attack is by the barrier frustrating application of grinding wheel through rapid ablation and wear of the wheel resulting in a need for frequent blade changes. It was observed during testing that when a cutting wheel is brought into contact with the barrier, the barrier material has a tendency to bind to the cutting wheel, and fill voids in the abrasive which impedes the cutting process. This phenomenon of barrier material binding to the abrasive cutting wheel is valuable knowledge that can be used in a wide variety of access delay applications.

CUTTING ATTACK EXAMPLES

Example 1

In this example, three different thicknesses of thermally sprayed zinc onto separate 3/8" thick plates of ASTM A36 steel substrate at thicknesses of 2 mm, 5 mm and 10 mm were tested. Each sample was subjected to linear abrasive cutting wheel attacks. The time to cut the sample depends on the attack approach. Tests were conducted to determine the impact of Zn on each attack approach. Comparison cuts were made on samples coated with typical wear resistant coatings (alumina, YSZ, and WC containing ceramics and metal matrix composites).

Figure 2:
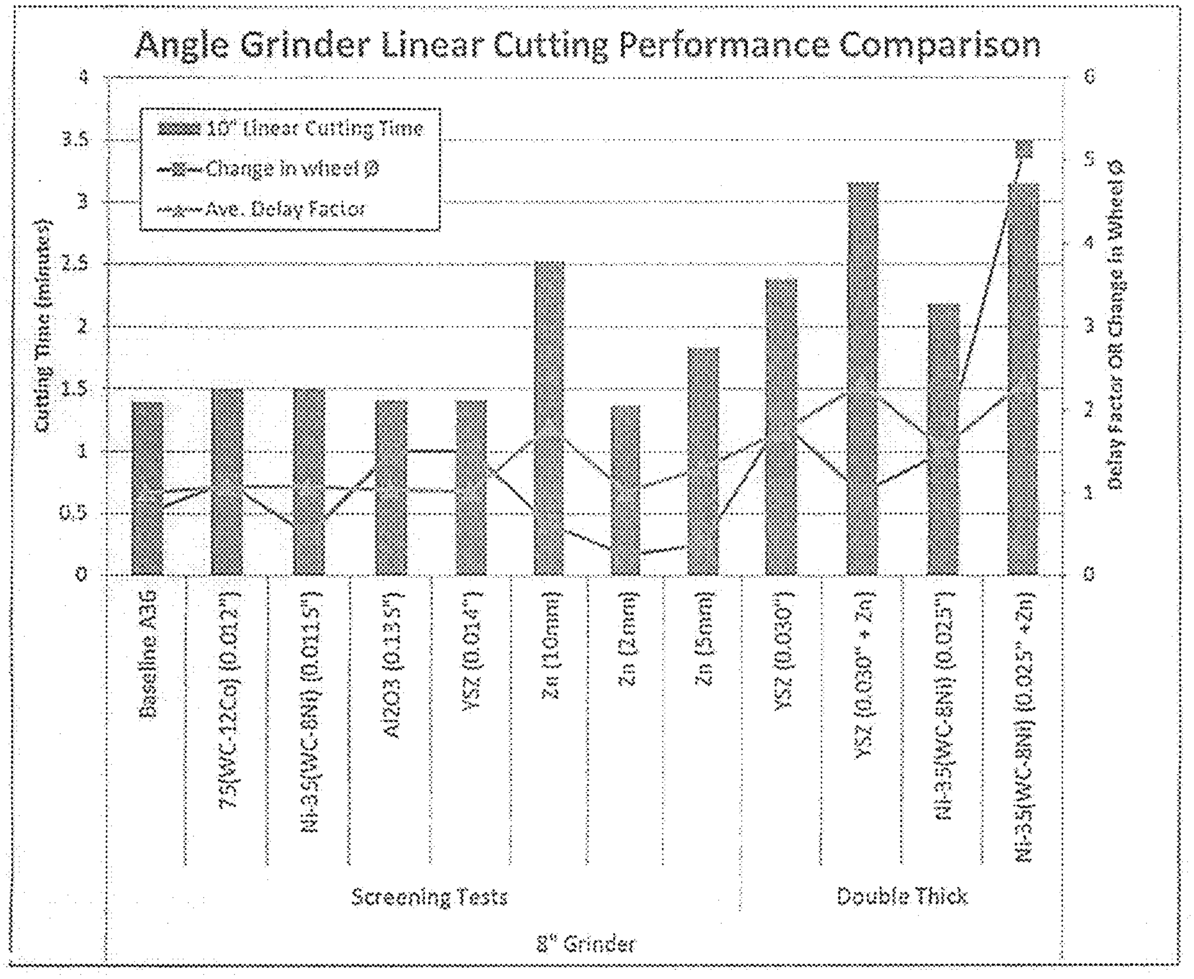
FIG. 2 shows the partial results of angle grinder linear cutting performance comparisons according to an embodiment of the disclosure.

The first attack approach involved making a 10" linear cut in the sample, starting at one of the sample edges. This was done by recording the time that it took to make 10" long cuts into a sample, and then comparing this to the amount of time that it takes to make an equivalent cut to an uncoated, bare ⅜" thick ASTM A36 sample. This comparison then gives a delay factor to gauge the effectiveness of the coating against linear cuts. The results of this test are shown in Table 1 and FIG. 2.

TABLE 1

| Performance of thermally sprayed Zinc and other coatings at various thicknesses for 10 inch linear abrasive cut. | | | | | | | |
|---|---|---|---|---|---|---|---|
| Coating | Coating Thickness (inches) | Attack Type | Attack Tool | Timed Cutting Rate (in/min) | Delay Factor | Change in wheel Ø (inches) | % Change in wheel Ø |
| Uncoated A36 Steel | No coating | Abrasion | 8" Grinder | 7.28 | 100% | 0.75 | 11% |
| 75(WC-12Co) | 0.012 | Abrasion | 8" Grinder | 6.79 | 107% | 1.13 | 14% |
| Ni-35(WC-8Ni) | 0.0115 | Abrasion | 8" Grinder | 6.79 | 107% | 0.50 | 6% |
| YSZ | 0.014 | Abrasion | 8" Grinder | 7.15 | 102% | 1.50 | 19% |
| $Al_2O_3$ | 0.135 | Abrasion | 8" Grinder | 7.01 | 104% | 1.50 | 19% |
| Zn (2 mm) | 2.11 mm | Abrasion | 8" Grinder | 7.23 | 101% | 0.25 | 3% |
| Zn (5 mm) | 5.65 mm | Abrasion | 8" Grinder | 5.56 | 131% | 0.38 | 5% |
| Zn (10 mm) | 10.735 mm | Abrasion | 8" Grinder | 4.02 | 181% | 0.63 | 8% |
| YSZ (double thick) | 0.030 | Abrasion | 8" Grinder | 4.17 | 175% | 1.875 | 23% |
| YSZ (double thick + Zn) | 0.030 + 2 mm Zn | Abrasion | 8" Grinder | 3.14 | 232% | 1 | 13% |
| Ni-35(WC-8Ni) (double thick) | 0.025 | Abrasion | 8" Grinder | 4.69 | 155% | 1.5 | 19% |
| Ni-35(WC-8Ni) (double thick + Zn) | 0.025 + 2 mm Zn | Abrasion | 8" Grinder | 3.13 | 232% | 5.125 | 64% |

As can be seen in Table 1, one unexpected result is that the "thinner" multi-layer barriers (a thin Zn overcoat on top of a cermet, WC or oxide wear layer) resulted in equivalent or better angle grinder wheel wear and delay factors than a very thick (~10 mm) Zn layer, and the results are better than simply "adding" the results from individual layers. In fact, the 0.025 inch (0.635 mm) thick WC coating with 2 mm Zn overlay caused the grinding wheel to wear to a point that it could not complete the 10" cut without changing to a new blade. This further delays tool performance by requiring an attacker to take time to change blades or tools, and to have these in possession. The results are shown graphically in FIG. 2.

While the 0.025 inch (0.635 mm) and 0.030 inch (0.762 mm) thick coatings of Ni-35(WC-8Ni) and YSZ produced linear cutting delays above 200%, an unexpected result of extremely high wheel wear was caused by coating a 2 mm Zn layer on top of the 0.635 mm Ni-35(WC-8Ni)-11Cr-2.5B-2.5Fe-2.5Si-0.5C intermediate layer. In fact, the 10 inch (254 mm) long cut could not be completed because the blade had ablated down to the same diameter as the angle grinder tool body. Cutting this plate caused a new cutting wheel that was 8 inch (203 mm) diameter, to be reduced to 2.875 inch (73 mm) diameter. This is a 64% reduction in diameter in only 9.5 inches (241 mm) of linear cutting, demonstrating very useful applications to a wide variety of access delay applications.

In Table 1, double thick refers to the thickness of the oxide or carbide (WC) layer. Initial oxide or carbide coatings were in the range of 0.012 to 0.014 inches (0.305-0.356 mm) thick, double thick refers to oxide or carbide coating layers in the range of 0.025 to 0.030 inches (0.635-0.762 mm).

Example 2

The second attack approach involved making a single plunge cut in the sample, starting in the middle of the sample, so that the angle grinder blade first penetrates the barrier coating followed by the substrate. Plunge cutting is the act of taking an abrasive grinding wheel and creating a cut perpendicularly to the surface area of the thermally sprayed side of the plate. The time it took to plunge through the sample, such that the arbor of the angle grinder touched the barrier surface, was recorded. This was compared to the baseline time to plunge through an uncoated sample to establish a delay factor for each coating sample. The results are shown in Table 2 and FIG. 3.

TABLE 2

| Coating | Coating Thickness (inches) | Attack Type | Tool | Plunge Time (min;sec) | Delay Factor | Diameter Change | Diameter Change |
|---|---|---|---|---|---|---|---|
| Uncoated A36 Steel | No coating | Abrasive Plunge | 8" Grinder | 00:50.8 | 100% | 0.75 | 11% |
| 75(WC-12Co) | 0.012 | Abrasive Plunge | 8" Grinder | 00:56.5 | 112% | 0.875 | 13% |
| Ni-35(WC-8Ni) | 0.0115 | Abrasive Plunge | 8" Grinder | 00:56.1 | 110% | 0.9375 | 13% |
| YSZ | 0.014 | Abrasive Plunge | 8" Grinder | 00:55.3 | 108% | 1 | 14% |
| $Al_2O_3$ | 0.135 | Abrasive Plunge | 8" Grinder | 00:57.7 | 114% | 1.25 | 19% |
| Zn (2 mm) | 2.11 mm | Abrasive Plunge | 8" Grinder | 01:10.0 | 137% | 0.75 | 10% |
| Zn (5 mm) | 5.65 mm | Abrasive Plunge | 8" Grinder | 01:33.0 | 182% | 1.125 | 16% |
| Zn (10 mm) | 10.735 mm | Abrasive Plunge | 8" Grinder | 02:13.0 | 261% | 1.125 | 15% |
| YSZ (double thick) | 0.030 | Abrasive Plunge | 8" Grinder | 01:23.1 | 163% | 0.625 | 8% |
| YSZ (double thick + Zn) | 0.030 (YSZ) + 2 mm (Zn) | Abrasive Plunge | 8" Grinder | 02:04.3 | 243% | 0.5 | 7% |
| Ni-35(WC-8Ni) (double thick + Zn) | 0.025 + 2 mm (Zn) | Abrasive Plunge | 8" Grinder | 01:55.9 | 227% | 1.875 | 23% |
| Ni-35(WC-8Ni) (double thick) | 0.025" + 2 mm (Zn) | Abrasive Plunge | 8" Grinder | 01:02.0 | 122% | 1 | 15% |

Figure 3:
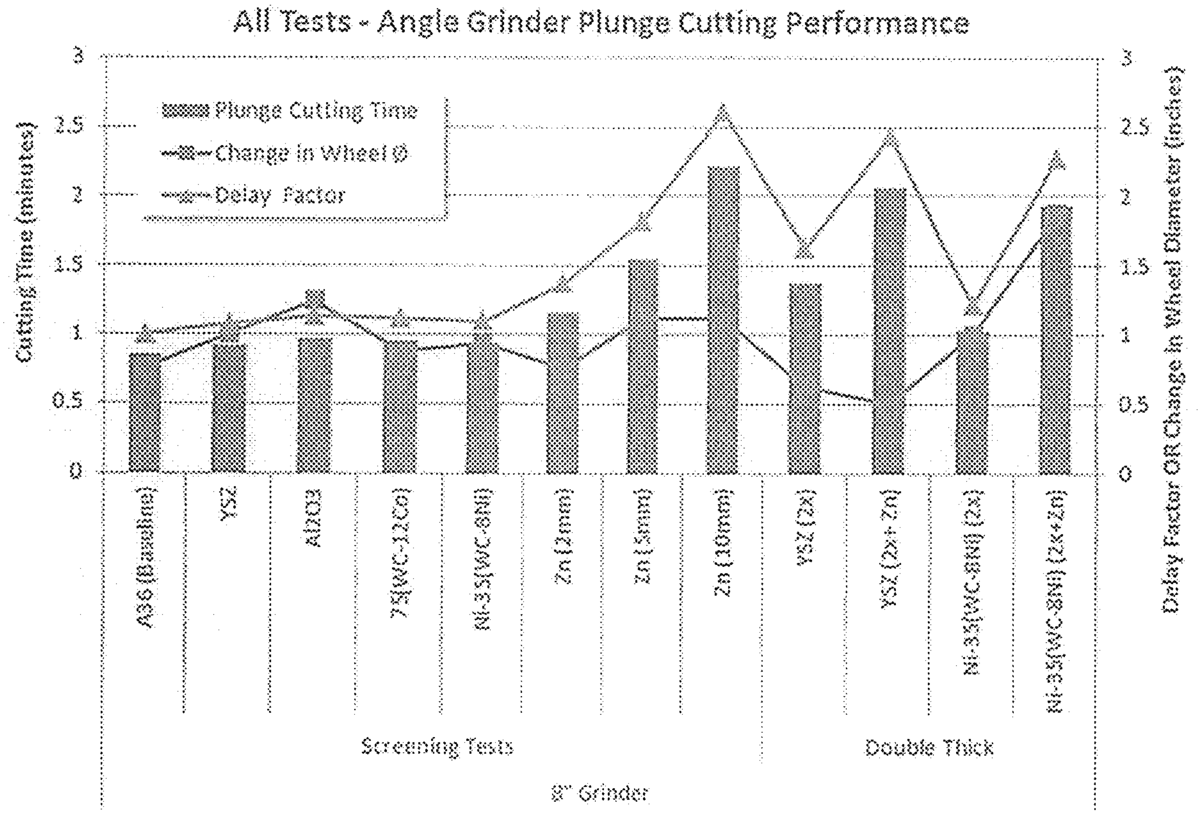
FIG. 3 shows the partial results of angle grinder plunge cutting performance tests according to an embodiment of the disclosure.

As can be seen in Table 2 and FIG. 3, the multi-layer barriers (those incorporating a thin Zn overcoat on top of an oxide or cermet layer) unexpectedly resulted in far greater delay factors than single-layer barriers, and the results are better than simply "adding" the individual coating performances together. There is a synergistic effect. As can also be seen in Table 2, the 2 mm, 5 mm and 10 mm Zn coatings unexpectedly took 137%, 182% and 261% longer to cut through when using plunge cuts then the bare plate. This is unexpected because Zinc is a relatively soft metal and would not be expected to provide abrasive grinding resistance.

This large delay increase occurs due to how the zinc interacts with abrasive cutting wheels. It was observed during testing that when a cutting wheel is brought into contact with zinc, the zinc has a tendency to bind to the cutting wheel, and fill voids in the abrasive which impedes the cutting process. This phenomenon of zinc binding to the abrasive cutting wheel is valuable knowledge that can be used in a wide variety of access delay applications. Performance data for cut off wheel plunging in samples with varying thicknesses of Zn is shown if Table 2 and FIG. 3, discussed above.

THERMAL ATTACK EXAMPLES

Example 3

In an example, an outer surface of a A36 carbon steel security barrier structural members was coated with a layer of zinc through a thermal spray process. Several Zn coating thicknesses were applied to the ⅜-inch thick A36 structural steel samples and tested against an exothermic Broco Torch® system by perforating the samples with the torch.

Figure 4:
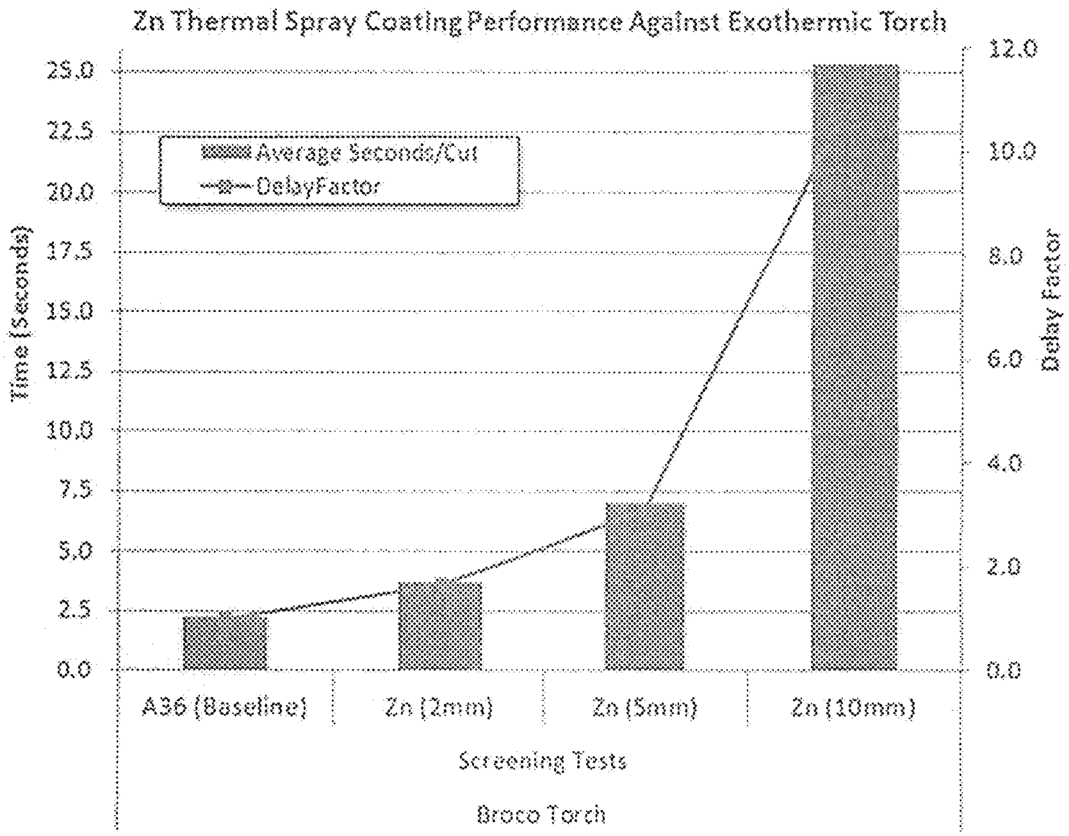
FIG. 4 shows the partial results of exothermic torch tests according to an embodiment of the disclosure.

An unexpected and non-linear result was discovered in the ability of Zn to resist exothermic cutting, in which thinner layers (1-5 mm) provided very little resistance. However, coating thicknesses near 10 mm exhibited a non-linear transition in which the performance value (thermal resistance) as measured by the time required to perforate, rapidly increases and provides an order of magnitude increase in perforation time over an uncoated sample. This is reflected in the data shown in FIG. 4.

Example 4

In another example, Zn coatings were applied as in the previous example, and an oxyacetylene torch was used to make 10 inch long cuts in the samples, and dividing by the total time to obtain a linear cutting rate for each coating thickness.

Table 3 shows a comparison of delay factors for single-layer and multi-layer thermal sprayed barrier systems against an uncoated A36 sample for oxyacetylene (OA) torch testing that includes the examples above.

TABLE 3

| Coating | Coating Thickness (inches) | Attack Type | Attack Tool | Cut Rate in/min | Delay Factor |
|---|---|---|---|---|---|
| Uncoated A36 Steel | No coating | Thermal | OA Torch | 13.29 | 100% |
| Ni-35(WC-8Ni) | 0.0115 | Thermal | OA Torch | 5.88 | 226% |
| 75(WC-12Co) | 0.012 | Thermal | OA Torch | 5.51 | 241% |
| $Al_2O_3$ | 0.135 | Thermal | OA Torch | 2.52 | 528% |
| YSZ | 0.014 | Thermal | OA Torch | 1.55 | 858% |
| Zn (2 mm) | 2.11 mm | Thermal | OA Torch | 2.29 | 580% |

TABLE 3-continued

| Coating | Coating Thickness (inches) | Attack Type | Attack Tool | Cut Rate in/min | Delay Factor |
|---|---|---|---|---|---|
| Zn (5 mm) | 5.65 mm | Thermal | OA Torch | 2.02 | 657% |
| Zn (5 mm) Upside-Down | 5.65 mm | Thermal | OA Torch | 3.12 | 426% |
| Zn (10 mm) | 10.735 mm | Thermal | OA Torch | 0.43 | 3115% |
| Ni-35(WC-8Ni) (double thick) | 0.025 | Thermal | OA Torch | 3.82 | 348% |
| Ni-35(WC-8Ni) (double thick + Zn) | 0.025 + 2 mm Zn | Thermal | OA Torch | 1.99 | 668% |
| YSZ (double thick) | 0.030 | Thermal | OA Torch | 1.77 | 749% |
| YSZ (double thick + Zn) | 0.030 + 2 mm Zn | Thermal | OA Torch | 1.26 | 1059% |

As can be seen in Table 3, exceptionally high levels of access delay factors can be achieved against an OA torch depending on the barrier material and thickness. Thicker layers do not necessarily translate into better thermal tool delay performance, which is an unexpected result, especially for YSZ. Residual stresses in thicker oxide and cermet layers result in surface defects and cracks that reduce the thermal resistance against and OA torch. Very thin oxide layers (YSZ or $Al_2O_3$) and Zn (2 mm) layers provided excellent delay factors. Multi-layer systems with a thin (2 mm) Zn overlay provided exceptionally high delay factors against torches. An unexpected result is that for an OA torch, the addition of a "thin" 2 mm Zn overcoat to an oxide layer such as YSZ provides greater than 10 times the delay value of an uncoated sample, against an OA torch. When considering cost and total thickness, this combination also provides better total performance per mm of thickness than any other thermally sprayed transition metal.

The data shoes that a "thinner" (ie, less expensive oxide or zirconia layer combined with a 'thin' 2 mm Zn overlay should provide very good results, better than either coating individually. The YSZ double-thick coatings did not perform as well as the thinner YSZ coatings (an unexpected result), suggesting that there is an optimal thickness for some thermally—sprayed coatings above which performance will suffer (due to residual stresses from the thermal spray process creating surface cracks which allow heat to penetrate down into the substrate). It is noted that 0.014 inch (0.3556 mm) thick YSZ+2 mm Zn overlay provided greater than 11 times delay factor against an OA torch.

In Table 3, the phrase "upside down" refers to performing the cutting of the coated sample by turning it upside down before applying the cutting tool. The test showed that having a thin Zn coating on the inside face of a barrier is not as good as having it on the outside face, but still much better than not adding any Zn at all. This also supports the finding of an unexpected result, as a person of ordinary skill would think the thermal tool could easily cut through the steel barrier similar to the controlled uncoated sample. This showed that the Zinc on the inside face helped to maintain structural integrity of the substrate/barrier until the torch had also penetrated the Zn layer As can be seen in Table 3, a "thinner"~0.012-0.014 inch (0.305-0.3556 mm) oxide or zirconia layer combined with a 'thin' 2 mm Zn overlay provides very unexpectedly good results, better than either coating individually. As can further be seen in Table 3, the YSZ double-thick coatings did not perform as well as the thinner YSZ coatings (an additional unexpected result), suggesting that there is an optimal thickness for some thermally—sprayed coatings above which performance will suffer (this is due to residual stresses from the thermal spray process creating surface cracks which allow heat to penetrate down into the substrate).

As a result of this testing, the inventors have unexpectedly found that thin layers of an oxide or carbide with a thin layer of soft metal will provide greater than 11 times delay factor against an OA torch. In an embodiment, the oxide or carbide layer thickness is between 0.006 (0.15 mm) and 0.020 inches (0.508 mm) thick. In another embodiment, the oxide or carbide layer is between 0.010 (0.254 mm) and 0.015 inches (0.381 mm) thick. In another embodiment, the oxide or carbide layer is 0.014 inches (0.356 mm) thick. In an embodiment, the soft metal layer thickness is between 0.5 mm and 15 mm. In another embodiment, the soft metal layer is between 2 mm and 10 mm. In another embodiment, the soft metal layer is 2 mm thick. In an embodiment, the soft metal is zinc.

Figure 5:
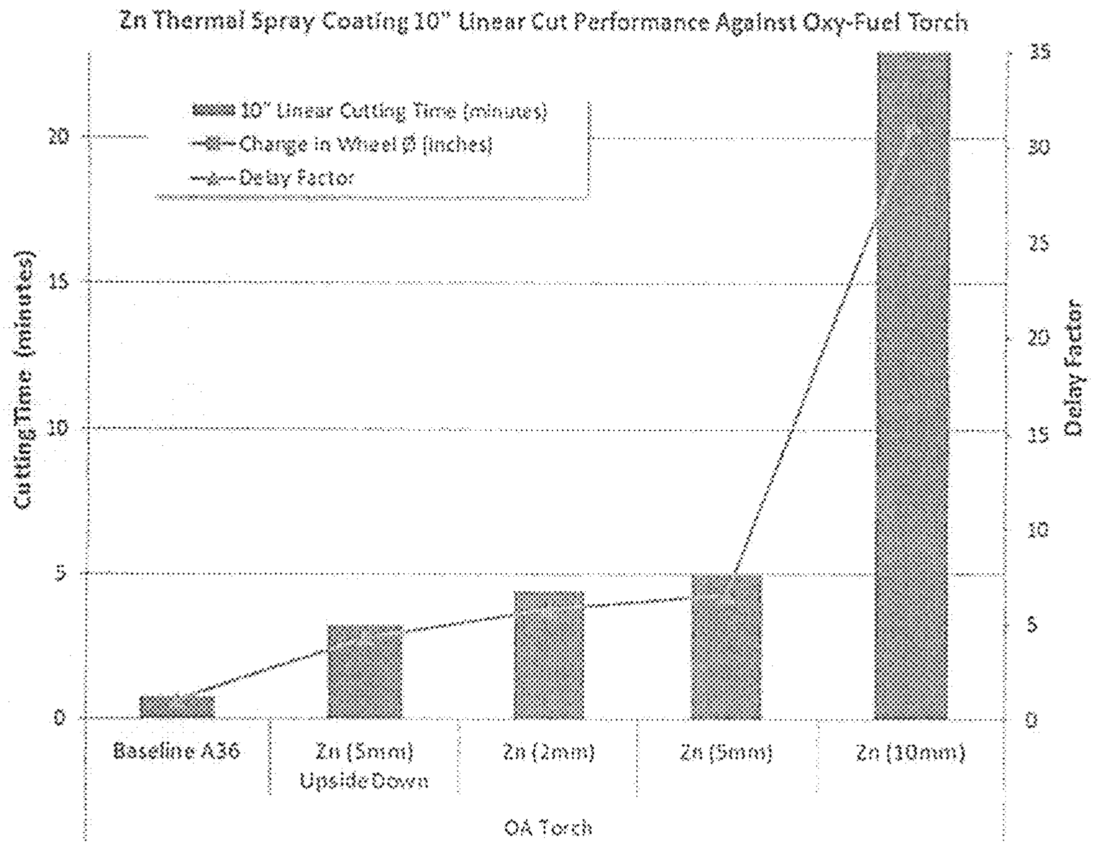
FIG. 5 shows the results of linear oxyacetylene torch cutting tests according to an embodiment of the disclosure.

As can further be seen in Table 3, an unexpected and highly non-linear result was discovered in the ability of pure Zn to resist oxy-fuel cutting, in which thin coatings (2-5 mm) increasing the cutting time by 4-6 times. Additionally, coating thicknesses approaching 10 mm exhibited a non-linear transition in which the performance dramatically improved to more than 30 times that of the uncoated steel. This is reflected in the data shown in FIG. 5.

Figure 6:
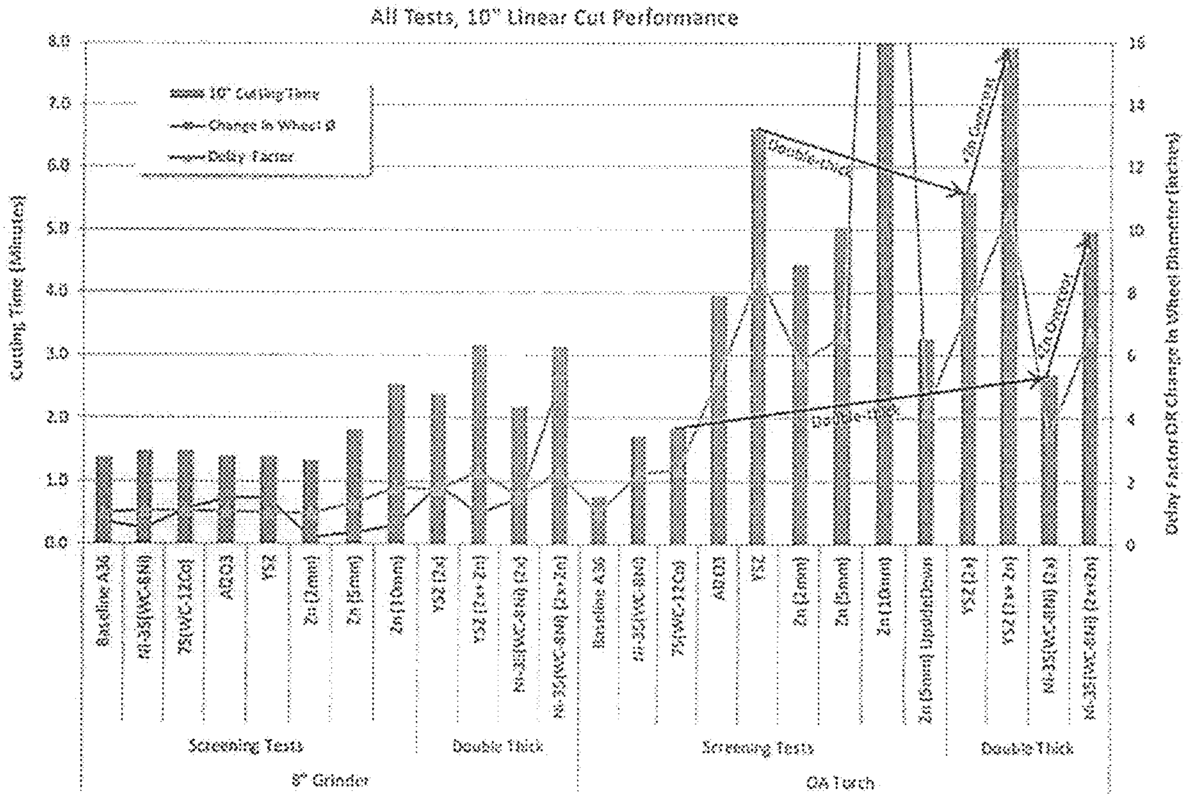
FIG. 6 shows the results of linear grinding and oxyacetylene torch cutting tests according to an embodiment of the disclosure.

FIG. 6 shows results from both grinding and thermal attack tests. As can be seen in FIG. 6, Zn coatings provided unexpectedly high resistance to both grinding and thermal cutting. FIG. 6 shows that increasing the thickness of the cermet or oxide wear layer provides no or minimal improvement in delay factors for the OA torch; however, adding a thin Zn over-coating (~2 mm) can dramatically improve torch cutting delay times. For grinding attacks, FIG. 6 shows that thicker oxide or cermet layers increase the delay time for linear angle grinding cuts. FIG. 6 also shows that the performance can be improved even further by adding a thin (~2 mm) Zn overcoat. This provides better linear grinding cut delay performance than having a very thick (~5 or ~10 mm) Zn coating, which is an unexpected result. When considering cost, weight and total thickness, this combination incorporating a Zn overlay also provides better total performance per mm of thickness than any other thermally sprayed transition metal. Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A barrier system, comprising:
a substrate; and
a barrier layer applied to and coated upon the substrate;
an additional barrier layer between and in contact with the substrate and the barrier layer, wherein the additional layer is formed of an additional barrier material selected from a group consisting of carbides and oxides; and
an outer layer covering the barrier layer, the outer layer selected from a group consisting of metals, ceramics, paints, polymers and epoxies;
wherein the barrier layer comprises a metal; and
wherein the metal is selected from a group consisting of zinc, lead, tin, aluminum, gallium, thallium, indium, antimony, bismuth and copper.

2. The barrier system of claim 1, wherein the metal is zinc.

3. The barrier system of claim 1, wherein the barrier layer has a thickness of between 0.5 mm and 17 mm thick.

4. The barrier system of claim 1, wherein the barrier layer has a thickness of between 2.0 mm and 10 mm thick.

5. The barrier system of claim 1, wherein the additional barrier material is selected from a group consisting of $Al_2O_3$, $TiO_2$, and yttria-stabilized zirconia.

6. A container for securing an item, comprising:
an enclosure at least partially defining an interior space;
wherein the enclosure includes a barrier system, the barrier system comprising:
a substrate; and
a barrier layer applied to and coated upon the substrate;
an additional barrier layer between and in contact with the substrate and the barrier layer, wherein the additional layer is formed of an additional barrier material selected from a group consisting of carbides and oxides; and
an outer layer covering the barrier layer, the outer layer selected from a group consisting of metals, ceramics, paints, polymers and epoxies;
wherein the barrier layer comprises a metal; and
wherein the metal is selected from a group consisting of zinc, lead, tin, aluminum, gallium, thallium, indium, antimony, bismuth and copper.

7. The container of claim 6, wherein the metal is zinc.

8. The container of claim 6, wherein the barrier layer has a thickness of between 0.5 mm and 17 mm thick.

9. The container of claim 6, wherein the barrier layer has a thickness of between 2.0 mm and 10 mm thick.

10. The container of claim 6, wherein the additional barrier material is selected from a group consisting of $Al_2O_3$, $TiO_2$, and yttria-stabilized zirconia.

11. A method of forming a protective enclosure, comprising:
disposing a barrier system between an object and a point of entry to the object, the barrier system comprising:
a substrate; and
a barrier layer applied to and coated upon the substrate;
an additional barrier layer between and in contact with the substrate and the barrier layer, wherein the additional layer is formed of an additional barrier material selected from a group consisting of carbides and oxides; and
an outer layer covering the barrier layer, the outer layer selected from a group consisting of metals, ceramics, paints, polymers and epoxies;
wherein the barrier layer comprises a metal; and
wherein the metal is selected from a group consisting of zinc, lead, tin, aluminum, gallium, thallium, indium, antimony, bismuth and copper.

12. The method of claim 11, wherein the metal is zinc.

13. The method of claim 11, wherein the barrier layer has a thickness of between 0.5 mm and 17 mm thick.

14. The method of claim 11, wherein the barrier layer has a thickness of between 2.0 mm and 10 mm thick.

15. The method of claim 11, wherein the additional barrier material is selected from a group consisting of $Al_2O_3$, $TiO_2$, and yttria-stabilized zirconia.

* * * * *